United States Patent
Vasquez

(10) Patent No.: US 10,145,120 B1
(45) Date of Patent: Dec. 4, 2018

(54) ROOFING MATERIAL MOVING APPARATUS

(71) Applicant: Jose Antonio Ortiz Vasquez, Oakland, CA (US)

(72) Inventor: Jose Antonio Ortiz Vasquez, Oakland, CA (US)

(*) Notice: Subject to any disclaimer, the term of this patent is extended or adjusted under 35 U.S.C. 154(b) by 0 days.

(21) Appl. No.: 15/912,662

(22) Filed: Mar. 6, 2018

Related U.S. Application Data

(62) Division of application No. 15/600,769, filed on May 21, 2017.

(51) Int. Cl.
  *E04D 15/06* (2006.01)
  *B62B 3/14* (2006.01)
  *B62B 3/00* (2006.01)
  *E04D 15/02* (2006.01)

(52) U.S. Cl.
  CPC ............ *E04D 15/06* (2013.01); *B62B 3/006* (2013.01); *B62B 3/1472* (2013.01); *B62B 3/14* (2013.01); *E04D 15/02* (2013.01)

(58) Field of Classification Search
  CPC ......... E04D 15/06; E04D 15/02; B62B 3/006; B62B 3/1472; B62B 3/14
  USPC ......... 52/749.12; 414/434; 280/47.17, 47.12, 280/63
  See application file for complete search history.

(56) References Cited

U.S. PATENT DOCUMENTS

| | | | |
|---|---|---|---|
| 1,374,379 A | 4/1921 | Klein | |
| 1,425,727 A | 8/1922 | Wallstrom | |
| 2,068,133 A | 1/1937 | Hindall | |
| 2,360,799 A | * 10/1944 | Slingsby | B62B 3/04 126/298 |
| 2,478,196 A | * 8/1949 | Johnston | B62B 3/04 414/491 |
| 2,569,050 A | 9/1951 | Gref et al. | |
| 2,656,050 A | 10/1953 | Best et al. | |
| 3,112,042 A | 11/1963 | Leshner | |
| 3,183,139 A | 5/1965 | Curtis | |
| 3,617,424 A | 11/1971 | Smith | |
| 3,889,831 A | 6/1975 | Davis | |
| 4,179,080 A | 12/1979 | Patnaude | |
| 4,460,433 A | 7/1984 | Boyd | |
| 4,648,935 A | 3/1987 | Brown et al. | |
| 4,806,194 A | 2/1989 | Wald | |
| 4,967,535 A | 11/1990 | Alderman | |
| 5,439,540 A | 8/1995 | Lippman et al. | |
| 5,468,010 A | 11/1995 | Johnson | |
| 5,996,300 A | 12/1999 | Hamlin | |
| 6,484,781 B2 | 11/2002 | Weaver | |
| 6,595,455 B2 | 7/2003 | Romes | |
| 7,175,732 B2 | 2/2007 | Robison et al. | |

(Continued)

*Primary Examiner* — Brent W Herring
(74) *Attorney, Agent, or Firm* — Nwamu, P.C.

(57) ABSTRACT

A roofing material moving apparatus. This apparatus facilitates loading, unloading, and unrolling a roll of roofing material. Two load supports form a concave shape having a depressed region, a fulcrum end, and a junction end. A pair of legs extends from the fulcrum end of the load supports. A first pair of narrow rollers rotatably affix to a first crossbar. A second pair of narrow rollers rotatably affix to a second crossbar. Two pair of wide rollers rotatably affix to a pair of third crossbars extending between the depressed region of the load supports. The two wheels work together as a fulcrum for movement and pivoting of the apparatus.

16 Claims, 6 Drawing Sheets

(56) References Cited

U.S. PATENT DOCUMENTS

| | | |
|---|---|---|
| 7,588,207 B1 | 9/2009 | Malkin |
| 9,051,737 B2 | 6/2015 | Whitten |
| 2002/0029859 A1 | 3/2002 | Weaver |
| 2002/0050543 A1 | 5/2002 | Romes |
| 2004/0188008 A1 | 9/2004 | Robison et al. |
| 2004/0188964 A1 | 9/2004 | Choi et al. |
| 2014/0147584 A1 | 5/2014 | Whitten |
| 2015/0308122 A1 | 10/2015 | Whitten |
| 2016/0376792 A1 | 12/2016 | Danielson |
| 2017/0072828 A1* | 3/2017 | Bacon .................. B60P 3/1066 |

* cited by examiner

ROOFING MATERIAL MOVING APPARATUS

CROSS-REFERENCE TO RELATED APPLICATION

This application is a divisional application of U.S. patent application Ser. No. 15/600,769, filed May 21, 2017.

BACKGROUND

The present disclosure relates generally to a roofing material moving, and, more specifically, to a hand cart that facilitates loading, unloading, and unrolling of a roll of roofing material.

It is known in the art that moving heavy or bulky objects by hand requires the use of a hand truck or dolly. This type of wheeled device consists of an elongated, normally upwardly and rearwardly projecting supporting frame, with arms at its upper end, a forwardly projecting material engaging and supporting toe plate at its lower end, and a pair of laterally spaced support wheels mounted at the lower end of the frame to face rearwardly thereof.

Typically, the objects to be moved are tilted forward, the ledge is inserted underneath them, and the objects are then allowed to tilt back and rest on the ledge. The truck and object are then tilted backward until the weight is balanced over the large wheels making otherwise bulky and heavy objects easier to move.

Often, the hand truck is used to carry roofing materials both to and onto a roof. The roofing materials, which come in rolls, are unrolled and laid across a roof so that edges overlap to create a seal. This method has been used for many decades. In many instances, the roofing materials are made with an adhesive undercoating layer, and, during their placement on a roof structure, the adhesive undercoating is preheated throughout the width of the roll of roofing material.

In many instances, the roll of roofing material is heavy, bulky, and difficult to handle; especially on a sloped roof. The process of rolling out the roofing material requires three or four workers—two workers to hold the roll and at least one worker to pull a length of the roll of material out. The roof often has protruding obstacles, such as chimneys and exhaust pipes, which create difficulties for this rolling out process.

It is within the aforementioned context that a need for the present disclosure has arisen. Thus, there is a need to address one or more of the foregoing disadvantages of conventional systems and methods, and the present disclosure meets this need.

BRIEF SUMMARY

Various aspects of a roofing material moving apparatus can be found in exemplary embodiments of the present disclosure.

A roofing material moving apparatus provides a generally elongated pair of arms that are spaced apart from each other. The pair of arms have a proximal end and a distal end. The arms are controlled from the proximal end that has handles.

The apparatus further includes a pair of load supports, which are also spaced apart. The load supports form a generally concave shape that is defined by a depressed region, a fulcrum end, and a junction end. The ends taper down to the depressed region such that an area is created to securely nestle a roll of roofing material. The junction end integrally joins with the distal end of the pair of arms.

The apparatus further includes a pair of legs that extend from the fulcrum end of the load supports. The pair of legs is oriented, generally, parallel with the pair of arms. The apparatus further includes a first pair of narrow rollers rotatably affixed to a first crossbar. The first crossbar extends between the arms at the distal end. The first pair of narrow rollers is positioned generally at the intersection of the junction end of the load supports and the distal end of the arms. A pair of first brackets mounts the first pair of narrow rollers to the first crossbar.

The apparatus further includes a second pair of narrow rollers rotatably affixed to a second crossbar. The second crossbar extends between the load supports at the fulcrum end. The second pair of narrow rollers is positioned generally at the intersection of the fulcrum end of the load supports and the second crossbar. A pair of second brackets mounts the second pair of narrow rollers to the second crossbar. A fourth crossbar extends between the arms at the proximal end.

The apparatus further includes two pair of wide rollers rotatably affixed to a pair of third crossbars extending between the depressed region of the load supports. The two pair of wide rollers are oriented normal to the plane formed by the pair of arms. The first pair of narrow rollers is oriented toward the second crossbar and sloped away from the plane formed by the pair of arms. The second pair of narrow rollers is oriented toward the first crossbar and sloped away from the plane formed by the pair of arms.

The apparatus further includes a pair of wheels rotatably mounted at the fulcrum end of the load supports. The wheels work to pivot the apparatus between an upright position and a horizontal position. The wheels also enable the apparatus to move while carrying the roll of roofing material.

In this manner, the pair of legs and the pair of wheels support the apparatus in the upright position. The proximal end of the pair of arms, together with the pair of wheels, supports the apparatus in the horizontal position. Additionally, the pair of arms, the first crossbar, and the second crossbar are positioned to help load and unload the apparatus from the upright position. And, when the apparatus is in the horizontal position, the first crossbar, the second crossbar, the pair of third crossbars, the narrow rollers, and the wide rollers are positioned to facilitate loading and unrolling roofing material onto a roof in considerably less time and with less effort, and with fewer workers, relative to conventional systems.

A further understanding of the nature and advantages of the present disclosure herein is realized by reference to the remaining portions of the specification and the attached drawings. Further features and advantages of the present disclosure, as well as the structure and operation of various embodiments of the present disclosure, are described in detail below with respect to the accompanying drawings. In the drawings, the same reference numbers indicate identical or functionally similar elements.

BRIEF DESCRIPTION OF THE DRAWINGS

FIG. 5A shows the roll of roofing material loaded in the concave-shaped pair of load supports, FIG. 5B shows the roll of roofing material held in the load supports as a length of material is pulled from the roll of roofing material, and FIG. 5C shows an extended length of roofing material pulled away from the roll while the roll remains in the apparatus according to an exemplary embodiment of the present disclosure.

DETAILED DESCRIPTION

Reference will now be made in detail to the embodiments of the disclosure, examples of which are illustrated in the accompanying drawings. While the disclosure will be described in conjunction with the preferred embodiments, it will be understood that they are not intended to limit the disclosure to these embodiments. On the contrary, the disclosure is intended to cover alternatives, modifications and equivalents, which may be included within the spirit and scope of the disclosure as defined by the appended claims. Furthermore, in the following detailed description of the present disclosure, numerous specific details are set forth to provide a thorough understanding of the present disclosure. However, it will be obvious to one of ordinary skill in the art that the present disclosure may be practiced without these specific details. In other instances, well known methods, procedures, components, and circuits have not been described in detail as to not unnecessarily obscure aspects of the present disclosure.

Figure 1:
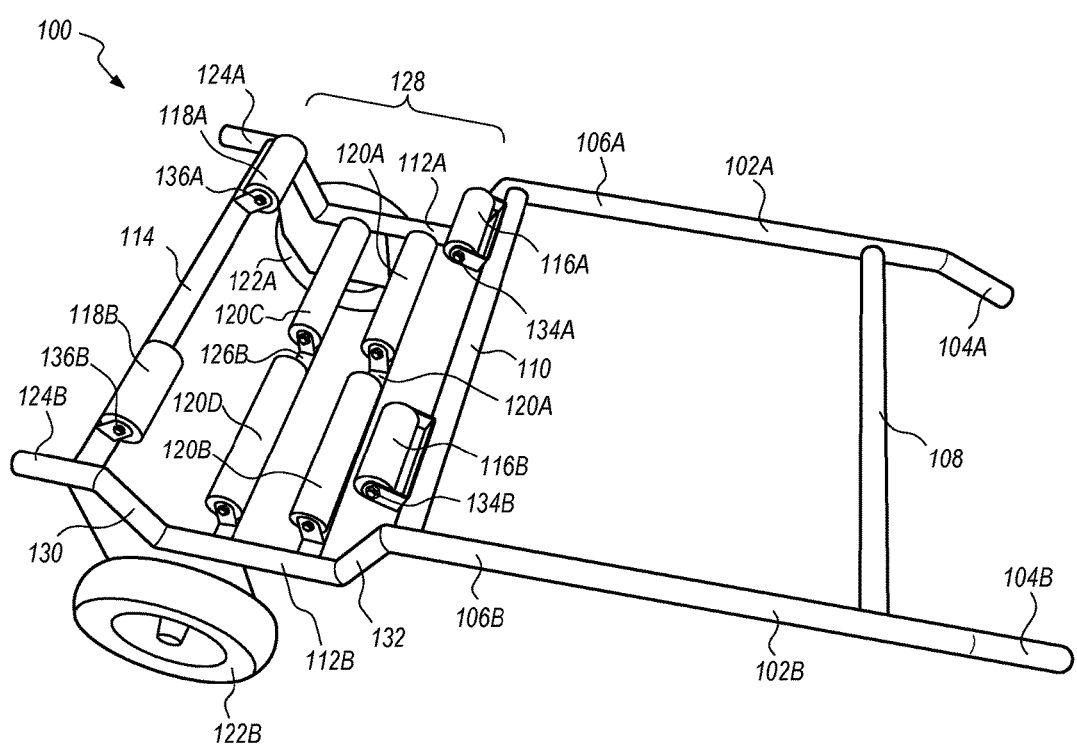
FIG. 1 illustrates a perspective view of a roofing material moving apparatus disposed in a horizontal position according to an exemplary embodiment of the present disclosure.

FIG. 1 illustrates a perspective view of a roofing material moving apparatus 100.

Roofing material moving apparatus 100 facilitates loading, unloading, and unrolling of a roll of roofing material 300 (in FIG. 5A) on a flat surface or a sloped roof. The roofing material moving apparatus 100, hereafter "apparatus 100," is unique in that the roll of roofing material 300 easily transports and rolls out while being securely nestled in a concave-shaped pair of load supports 112A and 112B that are integrated into the apparatus 100. Furthermore, variously sized and positioned rollers 116A-B, 118A-B, 120A-D are operational along the load supports to support the weight of the roofing material 300 and facilitate rolling out a length 302 (in FIG. 5B) of material from the roll of roofing material 300.

Furthermore, the apparatus 100 is equipped with a pair of arms 102A, 102B and a pair of wheels 122A, 122B to enable facilitated mobility of apparatus 100 and the roll of roofing material 300 and for pivoting the apparatus 100 between an upright position for transport and a horizontal position for unrolling the roll of roofing material 300. Another feature of the apparatus which is especially useful on a sloped roof, is a pair of short legs 124A, 124B that extend from the load supports 112A, 112B. Legs 124A, 124B help support the apparatus in the upright position.

As referenced in FIG. 1, apparatus 100 provides a generally elongated pair of arms 102B disposed in a laterally spaced-apart relationship. Arms 102B lie in a plane. Arms 102B have a proximal end 104B that is generally close to an operator of the apparatus 100, and a distal end 106B, that lies distally from the operator and which integrally join a pair of load supports 112A, 112B, as described below.

In one embodiment, arms 102A, 102B provide an elongated axis from which to manipulate, tilt, push, and pull apparatus 100 during operation. Arms 102A, 102B also provide support for the roll of roofing material 300 (FIG. 5A) when it is disposed axially along the arms 102A, 102B when the apparatus 100 is in an upright position. Arms 102A, 102B are controlled from the proximal end 104A, 104B, which can have grips or handles that are attached at an angle for providing better and more comfortable handling and for placing the moving apparatus in a horizontal position. Suitable materials for arms 102A, 102B include, without limitation, aluminum, steel, iron, metal alloys, wood, a rigid polymer, or combinations thereof.

Figure 2:
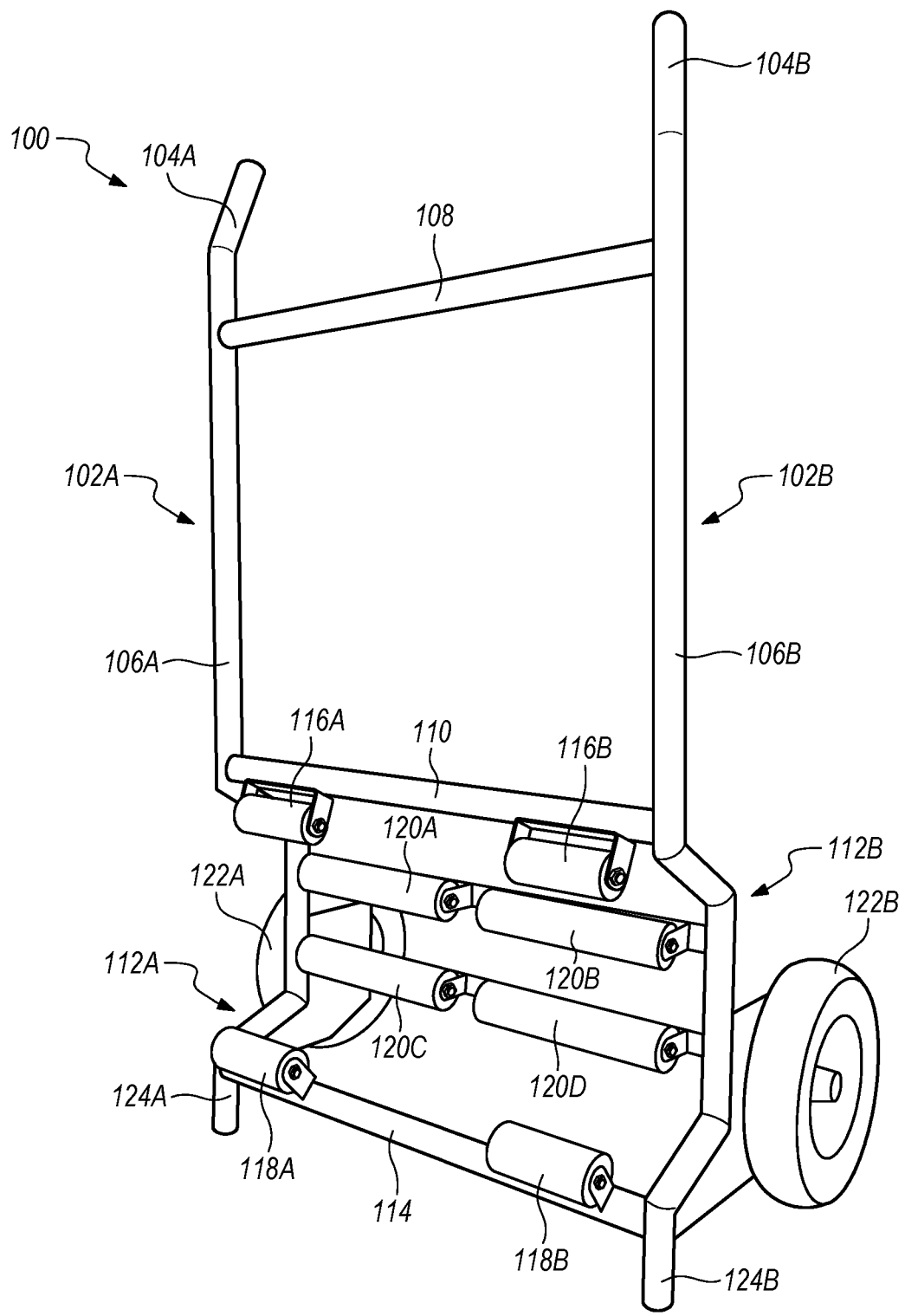
FIG. 2 illustrates a perspective view of the roofing material moving apparatus disposed in an upright position according to an exemplary embodiment of the present disclosure.

FIG. 2 illustrates a perspective view of the roofing material moving apparatus 100 disposed in an upright position.

Apparatus 100 further includes a pair of load supports 112A, 112B disposed in a laterally spaced-apart relationship. Load supports 112A, 112B form a generally concave shape that is defined by a depressed region 128 (FIG. 1) a fulcrum end 130, and a junction end 132. The junction end 132 integrally joins with the distal end 106A, 106B of the pair of arms 102A, 102B forming an integral unit.

Figure 4:
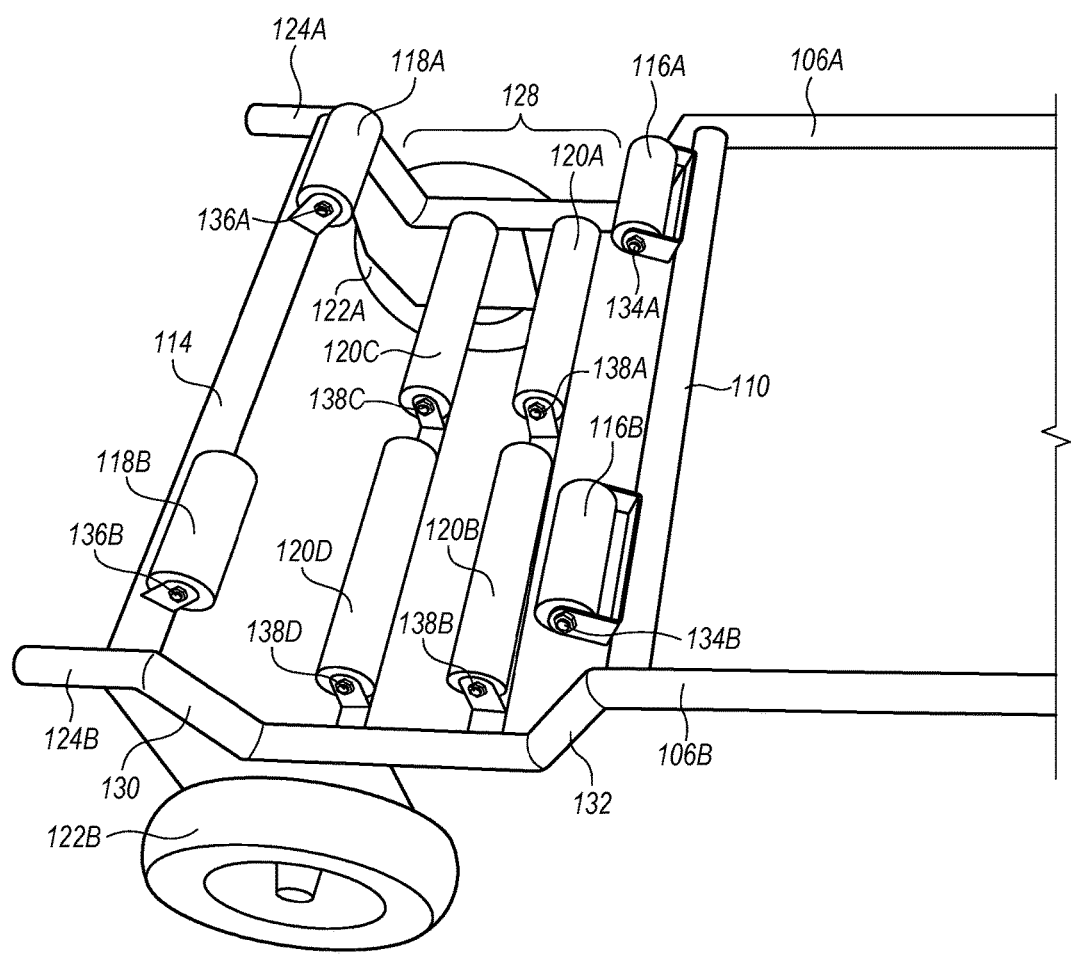
FIG. 4 illustrates a closeup view of the roofing material moving apparatus disposed in the horizontal position according to an exemplary embodiment of the present disclosure.
Figure 5A:
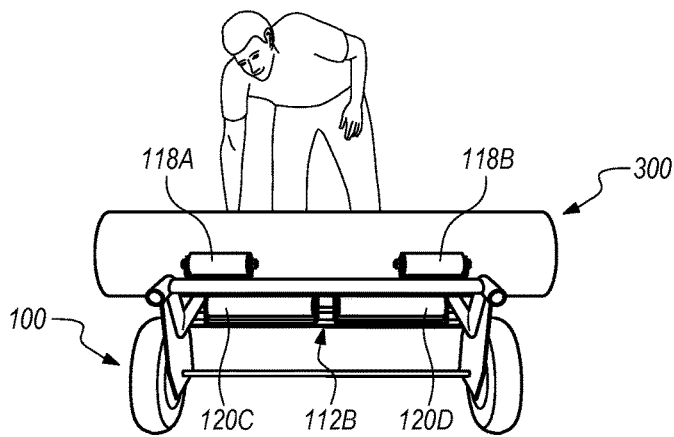
FIGS. 5A, 5B, and 5C illustrate perspective views of a roofing material moving apparatus in operation with a roll of roofing material where

It is the generally concave shape of the load supports 112A, 112B that receives and nestles the roll of roofing material 300 (FIG. 5A). The ends 130, 132 of the load supports 112A, 112B taper down forming the depressed region 128 such that an area is created that will securely envelope a roll of roofing material. Thus, a gap forms over the depressed region 128 of the load supports 112A, 112B. The gap is sized to receive a roll of roofing material while the apparatus is in the horizontal positions of FIG. 3 and FIG. 4, as well as, in the upright position (FIG. 2). This provides secure placement for the roll of roofing material during transport and while unrolling a length of roofing material from the roll.

In one embodiment, the concave shape created by load supports 112A, 112B is sharply angular at the fulcrum and junction ends although in other embodiments, these points of intersection may be rounded off. In any case, depressed region 128 that forms as a concave shape is sufficiently sized to receive the largest diameters of roofing material rolls known in the art. Similar to arms 102B, load supports 112A, 112B may also be fabricated from aluminum, steel, iron, metal alloys, wood, a rigid polymer, or combinations thereof.

Referring now to FIG. 2, apparatus 100 further provides a pair of legs 124A, 124B that extend integrally from the fulcrum end 130 of load supports 112A, 112B. The pair of legs 124A, 124B are oriented generally parallel with the plane that is formed by arms 102A, 102B, or, lets 124A, 124B extend in the same direction as the pair of arms 102A, 102B. In essence, the legs 124A, 124B are an extension of the fulcrum end 130 of load supports 112A, 112B. The legs 124A, 124B are effective for supporting apparatus 100 on a sloped roof while in the upright position as shown in FIG. 2. In some embodiments, legs 124A, 124B may be sized a few inches long and have a jagged or grip-like termini for inhibiting slippage.

Figure 3:
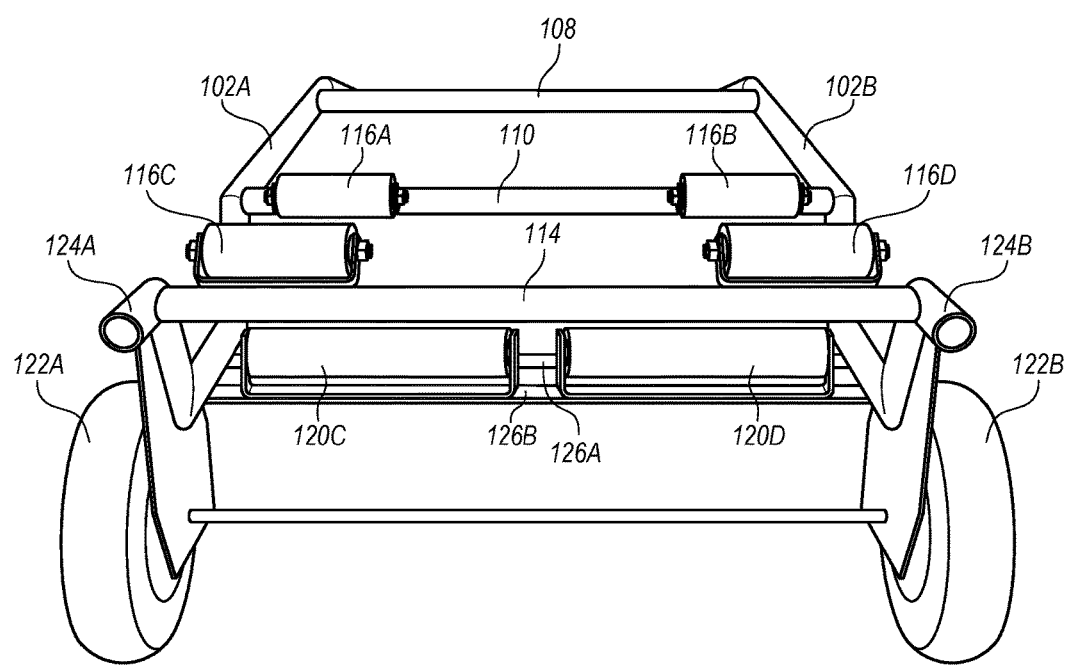
FIG. 3 illustrates a frontal view of the roofing material moving apparatus disposed in the horizontal position according to an exemplary embodiment of the present disclosure.

Referring now to FIG. 3, in apparatus 100, a first pair of narrow (small) rollers 116A, 116B rotatably affix to a first crossbar 110. The first crossbar 110 extends between arms 102A, 102B at the distal end 106A, 106B. The first crossbar 110 is generally perpendicular to the arms 102A, 102B and to load supports 112A, 112B thus providing both structural integrity to the apparatus 100 and a mounting surface for the first pair of narrow rollers 116A, 116B.

As shown in FIG. 1, this first pair of narrow rollers 116A, 116B is positioned generally at the intersection of the junction end 132 of load supports 112A, 112B and the distal end 106A, 106B of arms 102A 102B. The first pair of narrow rollers 116A, 116B is oriented toward the second crossbar 114 and sloped away from the plane formed by the pair of arms 102B. This orientation provides a unique angle for optimal engagement with the roll of roofing material 300 (of FIG. 5A) when positioned parallel to the load supports 112A, 112B.

In FIG. 3, a space exists between first narrow roller 116A and first narrow roller 116B. The space is sized to enable a roll of roofing material to position in while oriented axially with the arms 102B and load supports 112A, 112B—generally while apparatus 100 is in the upright position. In one embodiment, the first pair of narrow rollers 116A, 116B are not wide. This is so that the space between each first pair of the narrow rollers 116A, 116B is sufficiently wide for the roll of roofing material 300 (FIG. 5A) to dispose axially along the arms 102A, 102B and load supports 112A, 112B, between the first pair of narrow rollers 116A, 116B.

In FIG. 4, in some embodiments of apparatus 100, a pair of first brackets 134A, 134B mounts the first pair of narrow rollers 116A, 116B to first crossbar 110. While mounted, the first pair of narrow rollers 116A, 116B is generally freely rotatable so as to support the roll of roofing material 300 (FIG. 5A) while simultaneously allowing the roll 300 to rotate as a length 302 (FIG. 5B) of material is pulled from the roll of roofing material 300.

Apparatus 100 further includes a second pair of narrow rollers 118A, 118B rotatably affixed to a second crossbar 114. The second crossbar 114 extends between load supports 112A, 112B, at the fulcrum end 130. The second crossbar 114 is generally perpendicular to arms 102A, 102B and load supports 112A, 112B, providing both structural integrity to the apparatus 100 and a mounting surface for the second pair of narrow rollers 118A, 118B.

As illustrated in FIG. 4, a second pair of narrow rollers 118A, 118B is positioned generally at the intersection of fulcrum end 130 of load supports 112A, 112B and the pair of legs 124A, 124B (or intersection with the second crossbar 114). The second pair of narrow rollers 118A, 118B is oriented toward the first crossbar 110 and sloped away from the plane formed by the pair of arms 102A, 102B This orientation provides a unique angle for optimal engagement with the roll of roofing material 300 (FIG. 5A) when positioned parallel to the load supports 112A, 112B.

A space exists between each second narrow roller 118A and 118B. The space is sized to enable the roll of roofing material 300 to retain its position while oriented axially with the arms 102B and load supports 112A, 112B—generally while apparatus 100 is in the upright position.

A pair of second brackets 136a, 136b mounts a second pair of narrow rollers 118A, 118B to second crossbar 114. Similar to first pair of narrow rollers 116A, 116B, the second pair of narrow rollers 118A, 118B is freely rotatable, so as to support the roll of roofing material 300, while simultaneously allowing the roll 300 to rotate as a length 302 of material is pulled from the roll of the roofing material. Thus, the roll of roofing material 300 rests and rolls on both the first and second pair of narrow rollers 116A-B, 118A-B substantially contemporaneously.

As shown in FIG. 3, a fourth crossbar 108 extends between the proximal end 104A, 104B of the arms 102A, 102B. Fourth crossbar 108 enhances structural integrity of apparatus 100 and provides an additional surface for the roll of roofing material 300 (FIG. 5A) to rest on while axially disposed along the arms 102A, 102B.

In FIG. 4, apparatus 100 further provides additional rollers, namely two pair of wide rollers 120A-D. The wide rollers 120A-D are disposed in the depressed region 128 of the load supports 112A, 112B and work in conjunction with narrow rollers 116A-B, 118A-B on the crossbars 110, 114. Wide rollers 120A-D are rotatably affixed to a pair of third crossbars 126A, 126B (in FIG. 1) extending between the depressed region 128 of the load supports 112A, 112B. Third crossbars 126A, 126B are parallel and form a spaced apart relationship, which in some embodiments, is a few inches of separation. In one embodiment, two pair of brackets 138A-D (FIG. 4) mount the pair of wide rollers 120A-D to the respective crossbars 126A, 126B (FIG. 1).

As shown in FIG. 4, in one embodiment, the two pair of wide rollers 120A-D are oriented normal to the plane that is formed by the pair of arms 102A, 102B. In this manner, the wide rollers 120A-D orient upwardly to directly support and engage the roll of roofing material 300 (FIG. 5A). Similarly, the first pair of narrow rollers 116A, 116B are oriented toward the second crossbar 114 and slope away from the plane formed by the pair of arms 102A 102B. And, the second pair of narrow rollers 118A, 118B are oriented toward the first crossbar 1 and slope away from the plane formed by the pair of arms 102A, 102B.

FIG. 5A illustrates a close-up view of the apparatus 100 disposed in the horizontal position and illustrates the two pair of wide rollers 120A-D and the narrow rollers 116A-B, 118A-B supporting the roll of roofing material 300. As illustrated, the roll of roofing material 300 is loaded into the concave-shaped pair of load supports 112A, 112B, ready to be rolled out while rotatably engaging both narrow rollers 116A-B and 118A-B and wide rollers 120A-D.

This arrangement of narrow and wide rollers 116A-B, 118A-B, 120AD creates a synergy wherein the two pair of wide rollers 120A-D support the roll of roofing material 300 in the depressed region 128 of the load supports 112A, 112B from the horizontal position and the two pair of first and second narrow rollers 116A-B, 118A-B support the roll of roofing material 300 on the fulcrum end 130 and junction end 132 of load supports 112A, 112B from the horizontal position.

Figure 5B:
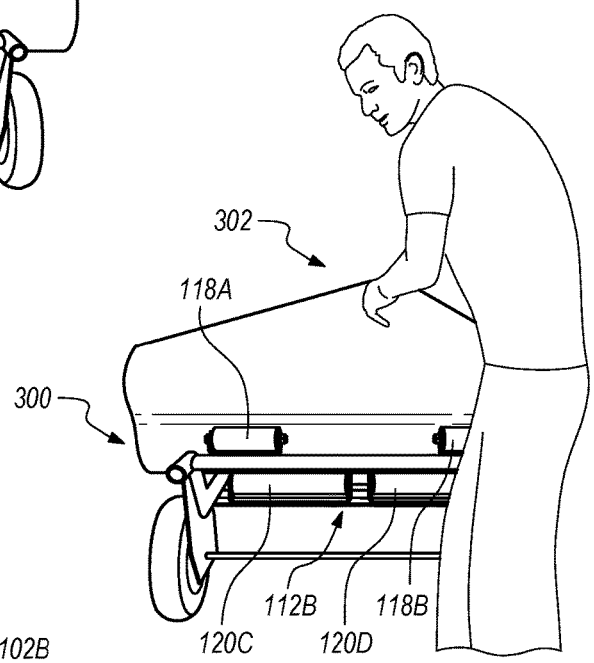
Figure 5C:
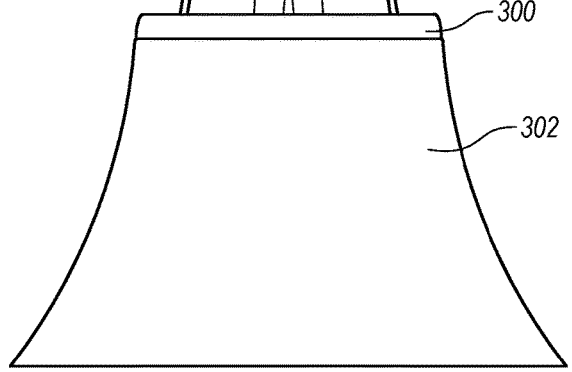

This relationship between rollers and the roll of roofing material 300 is shown in FIGS. 5B and 5C where the narrow and wide rollers 116A-B, 118A-B, and 120AD facilitate rolling out by a user of a length of roofing material 302 from the roll of roofing material 300 while the apparatus 100 is in the horizontal position.

Thus, the pair of arms 102B, the first crossbar 110, and the second crossbar 114 are positioned to help load and unload the roll of roofing material 300 when the apparatus 100 is in the upright position. That is, when the roll of roofing material 300 is axially disposed along the arms 102A, 102B and in the space between the narrow rollers 116A-B, 118A-B. Note that the four wide rollers 120A-D are generally wider and have a larger circumference or cross-sectional area than the first and second pair of narrow rollers 116A-B, 118A-B. This is so that the narrow rollers 116A, 116B create the space for the roll of roofing material 300 to dispose axially along the arms 102A, 102B.

In FIG. 1 when the apparatus 100 is in the horizontal position, the first crossbar 110, the second crossbar 114, the pair of third crossbars 126A, 126B, the narrow rollers 116A-B, 118A-B, and the wide rollers 120A-D are positioned to help load and unload the roll of roofing material 300 (FIG. 5) in load supports 112A, 112B. This is because the narrow and wide rollers 116A-B 118A-B 120A-D reduce friction and allow for easier unrolling when rolling out a length 302 (FIG. 5B) of material from the roll of roofing material 300.

In some embodiments, apparatus 100 provides a pair of wheels 122A, 122B that are rotatably mounted at the fulcrum end 130 of the load supports 112A, 112B. Wheels 122A, 122B work together as a fulcrum to pivot apparatus 100 between an upright position and a horizontal position. Wheels 122A, 122B also enable apparatus 100 to move while carrying the roll of roofing material 300. In one embodiment, wheels 122A, 122B are rubber wheels that rotate about an axis while in other embodiments, any method of mobility known in the art may be used for moving apparatus 100 and serving as a fulcrum.

Wheels 122A, 122B also serve as a point of support for apparatus 100 and roll of roofing material 300. In one embodiment, wheels 122A, 122B and the legs 124A, 124B that extend from the load supports 112A, 112B work in conjunction with each other to support the apparatus 100 in the upright position (FIG. 2). Further, the wheels 122A, 122B and the proximal end 104A, 104B of arms 102A, 102B support apparatus 100 in the horizontal position (FIG. 1). In either case, these four points of contact with the surface are effective for inhibiting slippage on a sloped roof.

Furthermore, wheels 122A, 122B can be advantageous for maneuvering apparatus 100 with the loaded roll of roofing material 300 around protruding obstacles on the roof such as chimneys and exhaust and pipes. Wheels 122A 122B can also serve as a pivot point to angle the length 302 of the roll of roofing material 300 along the roof surface so as to avoid obstacles and lay out the roofing material in geometric patterns.

Figure 6:
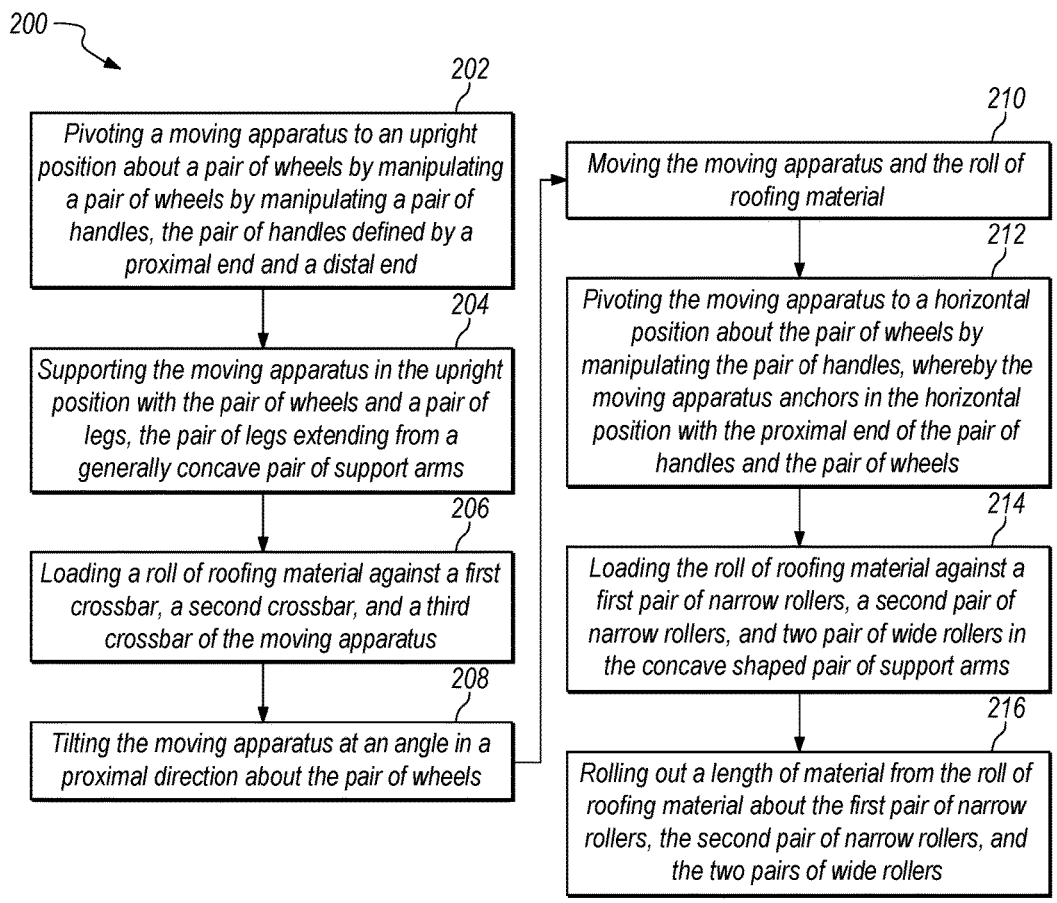
FIG. 6 illustrates a flowchart of a method for operating a roofing material moving apparatus according to an exemplary embodiment of the present disclosure.

FIG. 6 illustrates a flowchart of a method 200 for operating a roofing material moving apparatus.

Method 200 includes an initial block 202 of pivoting a moving apparatus to an upright position, a pair of wheels by manipulating a pair of arms, the pair of arms defined by a proximal end and a distal end. Arms 102A, 102B provide an elongated axis from which to manipulate, tilt, push, and pull apparatus 100 during operation. Arms 102A, 102B also provide support for the roll of roofing material 300 when disposed axially along the arms 102A, 102B.

Method 200 further includes block 204 of supporting the moving apparatus in the upright position with the pair of wheels and a pair of legs; the pair of legs extending from a generally concave pair of load supports (FIG. 2).

A block 206 includes loading a roll of roofing material against a first crossbar, a second crossbar, and a third crossbar (and against corresponding attached rollers) of the moving apparatus. FIG. 5A illustrates a close-up view of the apparatus disposed in the horizontal position and shows the two pair of wide rollers 120A-D and the narrow rollers 116A-B, 118A-B supporting the roll of roofing material 300.

A block 208 involves tilting the moving apparatus at an angle in a proximal direction about the pair of wheels. Arms 102B provide an elongated axis from which to manipulate, tilt, push, and pull apparatus 100 during operation.

A block 210 includes moving the moving apparatus and the roll of roofing material for placement on a roof. Apparatus 100 rolls on wheels 122A, 122B to facilitate the movement along a surface. Furthermore, wheels 122A, 122B can be advantageous for maneuvering apparatus 100 with the loaded roll of roofing material 300 around protruding obstacles on the roof, such as chimneys and exhaust pipes.

A block 212 includes pivoting the moving apparatus to a horizontal position about the pair of wheels by manipulating the pair of handles, whereby the moving apparatus anchors in the horizontal position defined by proximal end of the pair of handles and the pair of wheels (FIG. 1).

A block 214 includes loading the roll of roofing material against a first pair of narrow rollers, a second pair of narrow rollers, and two pair of wide rollers in the concave shaped pair of support arms. When the apparatus 100 is in the horizontal position, the first crossbar 110, the second crossbar 114, the pair of third crossbars 126A, 126B, the narrow rollers 116A-B, 118A-B, and the wide rollers 120A-D are positioned to help load and unload the roll of roofing material 300 in load supports 112A, 112B.

A block 216 (also illustrated in FIG. 5C) then rolls out a length of material from the roll of roofing material about the first pair of narrow rollers, the second pair of narrow rollers, and the two pair of wide rollers.

An advantage of the present invention is that it easily negotiates a roll of roofing material 300 across a flat surface or a sloped surface of a roof. Also, once the roll of roofing material 300 arrives at a predetermined starting location on the roof, the apparatus 100 serves as an anchoring mechanism of sorts. It holds the main roll of roofing material 300 down while rollers allow a free end to be pulled out as a length 302 of the roll of roofing material 300 across the roof for application of the material thereto. Unlike the conventional systems, that require four or more workers to lay out roofing material, the apparatus of the present disclosure requires fewer workers—typically one, but no more than two workers, to install roofing material.

While the above is a complete description of exemplary specific embodiments of the disclosure, additional embodiments are also possible. Thus, the above description should not be taken as limiting the scope of the disclosure, which is defined by the appended claims along with their full scope of equivalents.

I claim:

1. A moving apparatus comprising:
   an elongated pair of arms disposed in a laterally spaced-apart relationship lying in a plane, the pair of arms defined by a proximal end having handles and a distal end;
   a pair of load supports disposed contiguous with the distal end of the pair of arms, the pair of load supports forming a generally concave shape defined by a depressed region, a fulcrum end, and a junction end, the junction end joined integrally with the distal end of the pair of arms;
   a pair of legs extending from the fulcrum end of the load supports;
   a first pair of narrow rollers rotatably affixed to a first crossbar extending between the distal end of the pair of arms;
   wherein the first pair of narrow rollers is positioned generally at the intersection of the junction end of the load supports and the distal end of the arms;
   a second pair of narrow rollers rotatably affixed to a second crossbar extending between the two fulcrum ends of the pair of load supports;

wherein the second pair of narrow rollers is positioned generally at the intersection of the fulcrum end of the load supports and the pair of legs;

at least one pair of wide rollers rotatably affixed to a third crossbar extending between the depressed region of the load supports, wherein each wide roller is wider than each narrow roller along a rotational axis of each roller;

a pair of wheels rotatably mounted at the fulcrum end of the load supports, the pair of wheels configured to pivot the apparatus between an upright position and a horizontal position;

wherein the first pair of narrow rollers, the second pair of narrow rollers and the at least one pair of wide rollers are configured to facilitate unrolling of a roofing material disposed on the pair of load supports.

2. The moving apparatus of claim 1 wherein the handles are attached to the proximal end of the pair of arms at an angle so that when the moving apparatus is disposed in a horizontal position, the moving apparatus is supported by the handles as well as the pair of wheels.

3. The moving apparatus of claim 1, wherein the pair of legs extends from the fulcrum end along the same plane as the pair of arms so that when disposed in the horizontal position or the upright position, the moving apparatus is supported by the pair of legs and the pair of wheels.

4. The apparatus of claim 1, wherein the first, second, and third crossbars are oriented generally perpendicular to the pair of arms.

5. The apparatus of claim 1, wherein the pair of legs is oriented generally parallel with the pair of arms.

6. The apparatus of claim 1, wherein the at least one pair of wide rollers has a larger cross-sectional area than the cross-sectional area of the first and second pair of narrow rollers.

7. The apparatus of claim 1, wherein the first pair of narrow rollers is oriented in a direction that is toward the second crossbar.

8. The apparatus of claim 1, wherein the second pair of narrow rollers is oriented is a direction that is toward the first crossbar.

9. The apparatus of claim 1, wherein the at least one pair of wide rollers is oriented normal to the plane formed by the pair of arms.

10. The apparatus of claim 1, wherein the pair of load supports is configured to retain roofing material for unrolling when the moving apparatus is in a horizontal position.

11. The apparatus of claim 1, wherein the pair of load supports is configured to retain roofing material for transportation when the moving apparatus is in an upright position.

12. The apparatus of claim 1, wherein the depressed region and the at least one pair of wide rollers in the pair of support arms are configured to retain and support the roofing material for unrolling in a horizontal position.

13. The apparatus of claim 1, wherein the first and second pair of narrow rollers support a roll of roofing material on the fulcrum end and the junction end of the load supports in the horizontal position.

14. A moving apparatus comprising:

a generally elongated pair of arms disposed in a laterally spaced-apart relationship lying in a plane, the pair of arms defined by a proximal end and a distal end;

a pair of load supports disposed in a laterally spaced-apart relationship, the pair of load supports forming a generally concave shape defined by a depressed region, a fulcrum end, and a junction end, the junction end joined integrally with the distal end of the pair of arms;

a pair of legs extending from the fulcrum end of the load supports, the pair of legs being oriented generally parallel with the pair of arms;

a first pair of narrow rollers rotatably affixed to a first crossbar extending between the distal end of the pair of arms, wherein the first pair of narrow rollers is positioned generally at the intersection of the junction end of the load supports and the distal end of the arms, a second pair of narrow rollers rotatably affixed to a second crossbar extending between the fulcrum end of the pair of load supports;

wherein the second pair of narrow rollers is positioned generally at the intersection of the fulcrum end of the load supports and the second crossbar;

two pair of wide rollers rotatably affixed to a pair of third crossbars extending between the depressed region of the load supports, the two pair of wide rollers being oriented normal to the plane formed by the pair of arms, wherein each wide roller is wider than each narrow roller along a rotational axis of each roller;

a pair of wheels rotatably mounted at the fulcrum end of the load supports, the pair of wheels configured to pivot the apparatus between an upright position and a horizontal position; and wherein the first crossbar, the second crossbar, the pair of third crossbars, the narrow rollers, and the wide rollers are positioned to facilitate loading and unloading of a roofing material roll.

15. The apparatus of claim 14 wherein the first and second pair of narrow and the two pair of wide rollers facilitate rolling out a length of material from the roll of roofing material while the apparatus is in the horizontal position.

16. The apparatus of claim 15, wherein the narrow and wide rollers facilitate rolling out a length of material from the roofing material roll while the apparatus is in the horizontal position.

* * * * *